United States Patent [19]
Kiera

[11] Patent Number: 5,655,478
[45] Date of Patent: Aug. 12, 1997

[54] VENTILATION SYSTEM ADAPTED FOR USE WITH LITTER BOXES

[76] Inventor: Heiko-Roberto Kiera, 222 Lake Dr., Oviedo, Fla. 32765

[21] Appl. No.: 402,851

[22] Filed: Mar. 13, 1995

[51] Int. Cl.$^6$ .................................................. A01K 29/00
[52] U.S. Cl. ................................................................ 119/165
[58] Field of Search ...................................... 119/165, 418, 119/419, 493, 500

[56] References Cited

U.S. PATENT DOCUMENTS

| | | | |
|---|---|---|---|
| 3,985,102 | 10/1976 | Yonezawa | 119/19 |
| 4,522,150 | 6/1985 | Gershman | 119/19 |
| 5,044,325 | 9/1991 | Miksitz | 119/165 |
| 5,134,972 | 8/1992 | Compagnucci | 119/500 X |
| 5,140,948 | 8/1992 | Roberts | 119/165 |

*Primary Examiner*—Thomas Price
*Attorney, Agent, or Firm*—Julian C. Renfro, Esq.

[57] ABSTRACT

An adapter device for providing forced air ventilation to a litter box having an upper vent location, this adapter device comprising a housing member of generally rectangular configuration having a lower portion, an interior portion, and an upper portion. An external duct fitting is mounted upon the upper portion, and a downwardly dependent skirt member extends continuously around the lower portion. An internal duct extends upwardly through the lower portion of the housing member, through the interior portion, being connected to the external duct fitting located on the upper portion. An electric fan is located in the interior portion and operatively mounted in the internal duct, with electric current being supplied to the fan, so that it can selectively be caused to rotate and cause air from the litter box to be pumped upwardly through the internal duct to the external duct fitting located on the upper portion. A flexible hose is connected to the external duct fitting for delivering the air to a remote location. This adapter device, when the downwardly dependent skirt is placed over the upper vent location of the litter box, causes air to be removed from the litter box and to be delivered through the flexible hose to the remote location.

19 Claims, 4 Drawing Sheets

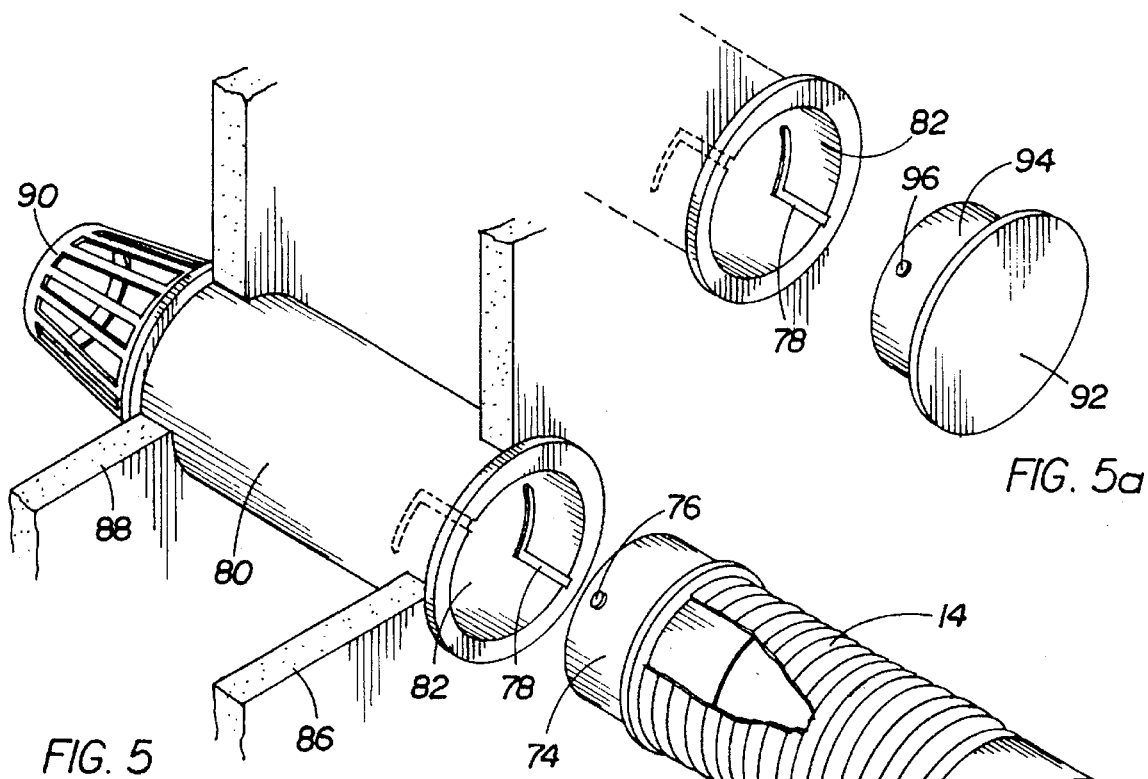
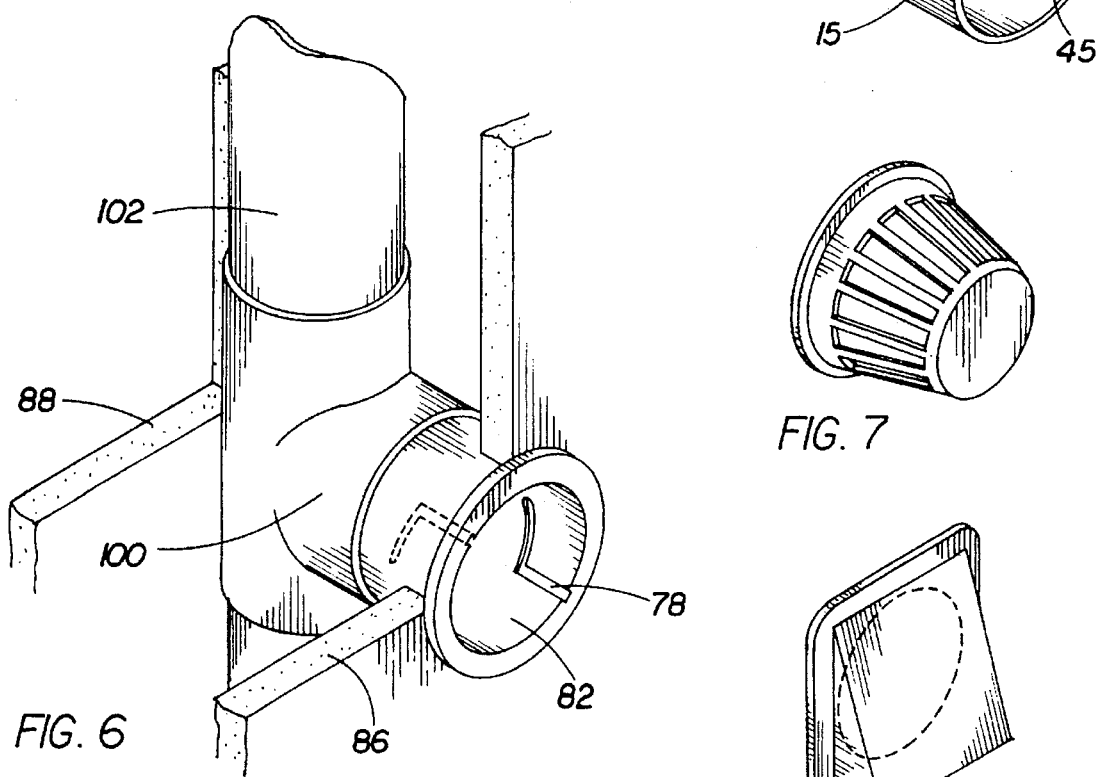

5,655,478

1

VENTILATION SYSTEM ADAPTED FOR USE WITH LITTER BOXES

BACKGROUND OF THE INVENTION

Many cat fanciers and others who keep animals in a home, apartment or other such living space provide devices variously known as pet litter boxes or kitty litter boxes, so that the animal may be left unattended for relatively long periods of time. One example of a device is the Miksitz U.S. Pat. No. 5,044,325 entitled "Ventilated Litter Box," which provides a tray with a porous bottom below which an electrically operated exhaust fan is located. Connected to the outlet of the exhaust fan is a flexible duct leading through an outer wall so that the foul air from the litter box can be delivered out of doors.

The Roberts U.S. Pat. No. 5,140,948 entitled "Vented Cat Litter Box Apparatus" is generally along the same lines except that it utilizes a fan motor in a duct leading out of the litter box, with the operation of the fan motor likewise delivering the foul odors of the litter box to an outside location.

The Compagnucci U.S. Pat. No. 5,134,972 entitled "Ventilated Pet Litter Box" utilizes a forced air exhaust system intrinsic to the upper portion of the litter box which, like the other patented devices, delivers the odors of the litter box through a wall to an outside location.

Although these devices containing built-in forced air ventilation systems are generally satisfactory, they are necessarily more expensive than ordinary litter boxes and in many instances are difficult to repair. It is therefore the intent of the present invention to accomplish the same basic goal as these patented devices, but at a considerable dollar saving.

SUMMARY OF THE INVENTION

I have provided in accordance with this invention an adapter device for providing forced air ventilation to a container, such as a litter box having an upper vent location, with this adapter device comprising a housing member of generally rectangular configuration. The housing member has a lower portion, an interior portion, and an upper portion. An external duct fitting is mounted upon the upper portion, and a downwardly dependent skirt member extends continuously around the lower portion. An internal duct extends upwardly through the lower portion of the housing member, through the interior portion, and is connected to the duct fitting located on the upper portion.

An electric fan is operatively mounted in the internal duct, and means are provided for supplying electric current to the fan, so that the fan can be caused to rotate and cause air to be pumped upwardly through the internal duct to the external duct fitting located on the upper portion. Means connected to the external duct fitting delivers the air pumped by the fan to a remote location, with this means preferably being a flexible tube.

Therefore, my novel adapter device, when the downwardly dependent skirt is placed over the upper vent location of a container, such as any of a wide variety of commercially available litter boxes designed for use by a cat, puppy or other pet, and the fan caused to operate, causes the foul odors of a litter box to be withdrawn and forcefully delivered via the flexible hose to an outer wall or to the roof of a building, so that the odors can be readily routed to an out of doors location.

2

Because a relatively soft, conformable seal member is utilized around the lowermost edge of the housing member, a leakproof relationship with the vent of the litter box is established, even though the top surface of the particular litter box may not be entirely flat.

A primary object of this invention is therefore to provide a ventilated adapter device enabling a pet owner to readily convert an ordinary, commercially available litter box for a cat, puppy or other pet into a ventilated litter box, with the foul odors emanating from the box being delivered through an outer wall to an outside location.

It is another object of this invention to provide a ventilated adapter device of uncomplicated, low cost construction, involving the use of a light weight housing member equipped with a conformable seal around its lower edge, so that this device can be readily placed, in a leakproof manner, around a vent located in the upper surface of a container, such as an ordinary litter box, with an electrically operated fan member contained in the housing member serving to withdraw the foul odors emanating from the box and deliver such odors by means of a flexible hose or tube through an outside wall of a home, or the roof of an apartment, condominium or the like, to an out of doors location.

It is yet another object of this invention to provide a ventilation system usable in a single family house, where the foul odors emanating from a litter box or the like are conveyed to the outside by piping them directly through an outer wall, as well as a ventilation system usable in apartment houses, condominia and the like, where the foul odors are directed upward through an interior wall to the roof of the building.

It is still another object of this invention to provide a ventilated adapter device involving a novel lightweight housing constituted by upper and lower portions, between which an electric fan is operatively connected, with the electric fan being ducted so as to withdraw foul air from a litter box upon which the housing resides, and force such air out through a flexible duct connected to an outside wall, or to the roof of a building.

It is yet still another object of this invention to provide a ventilated adapter device ideally used with a litter box for a pet, involving a lightweight housing of affordable construction that incorporates an electric fan, with this novel device operatively associated with ducting connected so as to deliver foul air withdrawn by the fan from the litter box to an out of doors location, with means provided for preventing the entry of unwanted pests or insects through the ducting when the device is not in use.

These and other objects, features and advantages will be more apparent as the description proceeds.

BRIEF DESCRIPTION OF DRAWINGS

FIG. 5 is a view of a rigid duct member installed in a location extending directly through inner and outer walls of a home or building to an out of doors location, to which rigid duct member, the end of a flexible duct member may be readily and releasably attached;

FIG. 5a is a fragmentary view revealing how the outlet duct of FIG. 5 can be capped off when the flexible tube has been removed, with this feature preventing the ingress of insects into the home or building;

FIG. 6 is a view generally similar to FIG. 5 but revealing that the rigid duct member can turn upwardly on the inside of an interior wall, and deliver foul odors to the outside from the roof of an apartment, condominium, or other such building, without passing directly through an outer wall;

FIG. 7 is a fragmentary view of the type of protective device that may be utilized to prevent a rodent from entering the outlet duct from an out of doors location; and FIG. 8 is a view of a different type of device that may be used on the outer portion of the duct member to direct the removed air downwardly, and to prevent the entry of outside air into the home or building.

DETAILED DESCRIPTION

Figure 1:
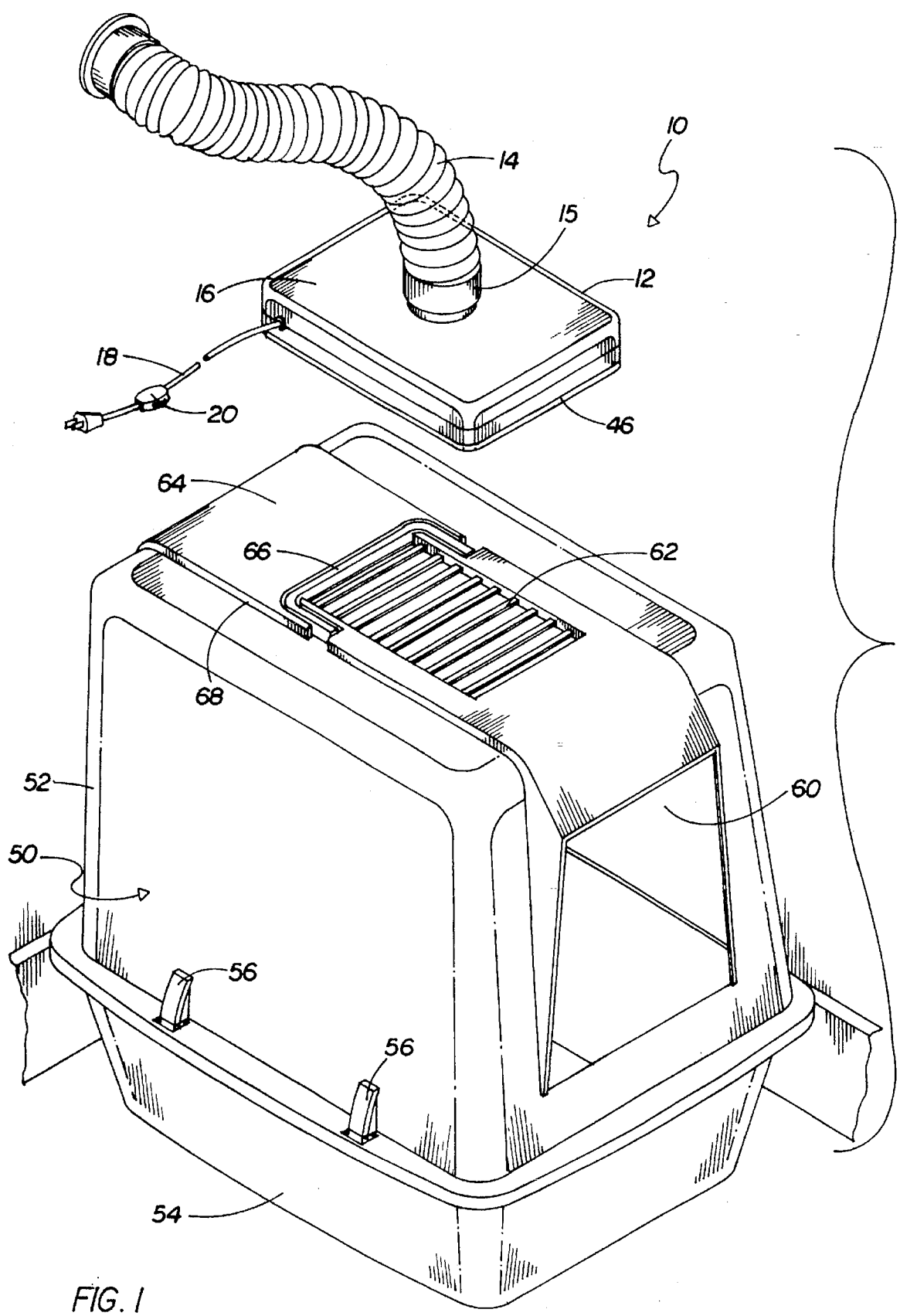
FIG. 1 is a perspective view showing my novel ventilated adapter device in exploded relationship to a conventional litter box, with my device involving a housing configured so as to be readily placed over a vent located in the upper surface of the litter box, so that foul odors of the litter box can be withdrawn through a vent located in the upper surface of the litter box and expelled through a highly effective piping system to an out of doors location.

With initial reference to FIG. 1, it will be seen that I have illustrated my novel ventilated adapter device 10 in accordance with this invention, shown in a slightly raised relationship to a container to be ventilated, such as a litter box 50 of substantially conventional construction. The ventilated adapter device 10 may be seen to involve a generally rectangularly-shaped housing member 12, preferably having rounded corner edges, and preferably made up of upper and lower portions secured together in a tight fitting manner, described hereinafter. An industrial grade plastic may be utilized in the construction of the upper and lower portions of the housing member 12, but obviously I am not to be limited to this.

It will be noted in FIG. 1 that a flexible vent tube 14 of substantial length is connected in a central portion of the upper surface 16 of the housing member 12, which tube is typically fitted with what may be regarded as a male connector at one end, and a female connector at the other end. The female end 15 of the hose or tube 14 may be seen in FIG. 1 to be operatively connected to my adapter device at a location just above the upper surface 16 of the housing 12, whereas in FIG. 2 I reveal the female end 15 of the hose or tube in a position slightly removed from the male member 42 that is mounted on the upper surface 16 of the housing member 12.

Figure 2:
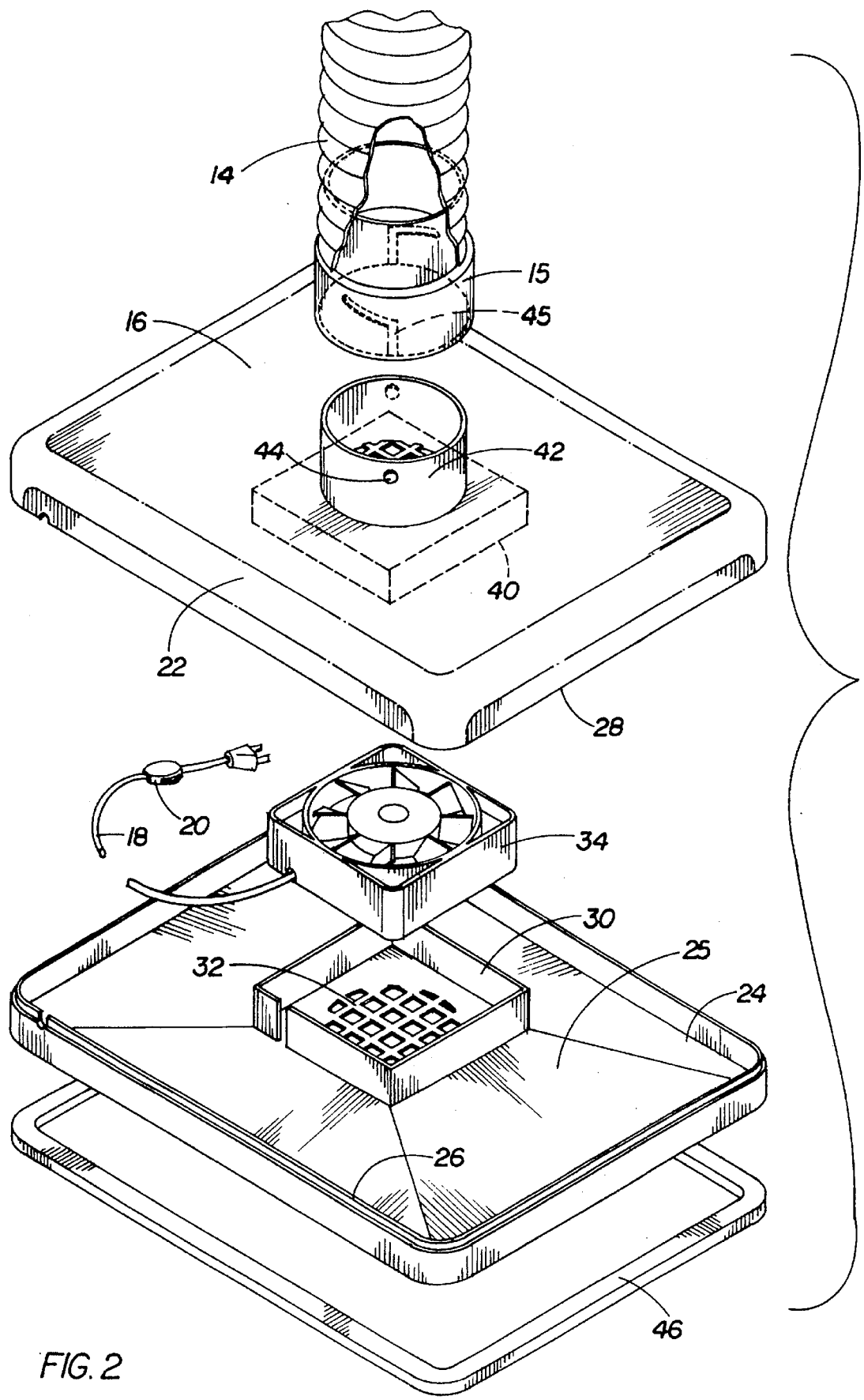
FIG. 2 is a view showing upper and lower portions of my novel housing member in exploded relation in order to reveal the manner in which an electric fan is disposed in a highly effective location between the upper and lower portions of the housing member.
Figure 3:
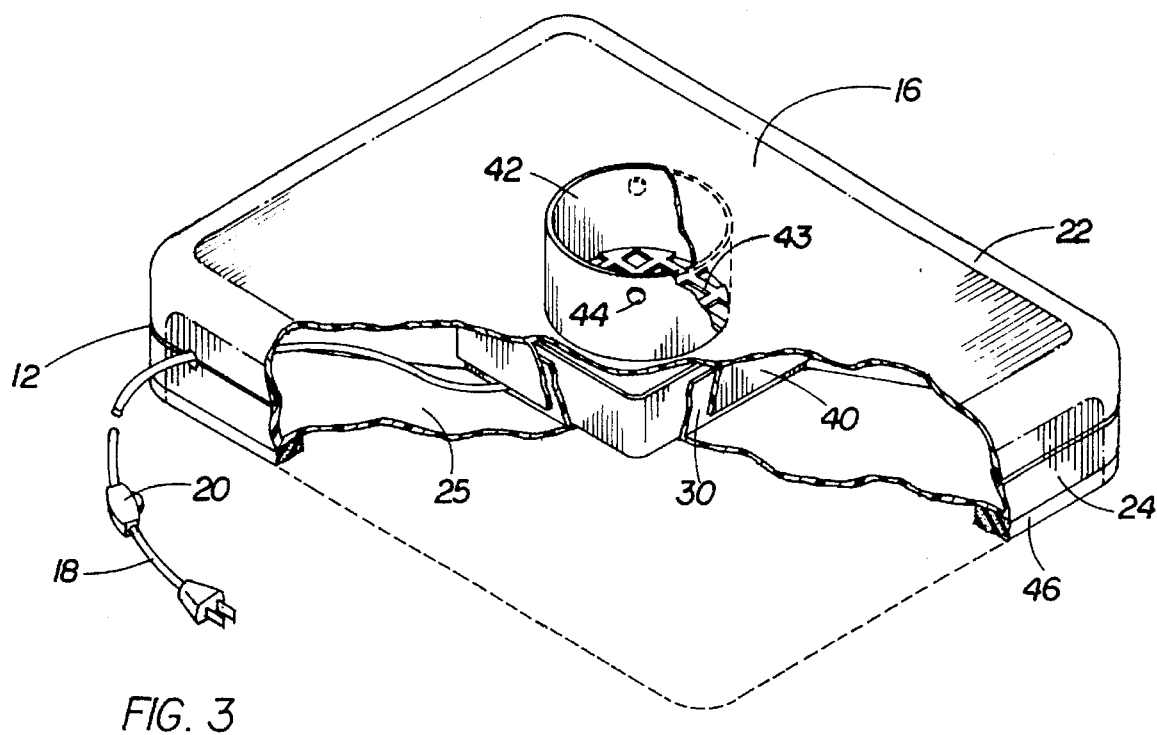
FIG. 3 is a view of the upper and lower portions of my novel housing member in assembled relation, but with edge portions broken away to reveal internal construction.

Extending outwardly through the housing member 12 is an electric cord 18, installed in which is an electric on-off switch 20, visible in FIGS. 1 through 3. The switch 20 is preferably a multiposition switch, operatively associated with the provision of electrical power from a conventional wall socket to an electric fan arrangement contained in the housing member 12. The positioning of the fan will be described shortly.

The multiposition electric switch 20 enables a user to turn on or off, an electrically powered ventilator fan 34 disposed, as revealed in FIG. 2, in an interior portion of the rectangularly-shaped housing member 12. The fan may have either two speeds, high or low, or three speeds, low, medium or high. When operational, the fan, in a readily understood manner, provides a highly desirable ventilating action, pulling foul air from the interior of the litter box 50, and forcefully expelling it through flexible vent tube 14 to an out of doors location.

With continued reference to FIG. 1, it is to be seen that my novel ventilated adapter device involves the use of an essentially flat housing member 12 having a width substantially greater than its thickness. Because of its configuration, it may be easily placed upon the top portion of a litter box 50 of conventional construction, thus to convert an ordinary litter box into a litter box having a forced air ventilation system. As will be seen hereinafter, the lowermost edge of the housing member 12 of my novel device utilizes a highly effective, conformable seal 46, enabling my ventilated adapter device to be placed in a leak-free relationship around the upper vent 62 located in the upper surface 64 of the ordinary litter box 50. As should be obvious, my novel ventilation arrangement may be used with containers other than a litter box.

The litter box 50 may be seen in FIG. 1 to have an upper or principal portion 52, which is removably attached to lower litter box portion 54, such as by a series of easily manipulated clamps 56 of conventional construction. An entrance port 60 for a cat, puppy or other pet is provided in the upper portion 52 of the litter box, and important to the utilization of my invention, the previously mentioned, generally rectangularly-shaped vent member 62 is utilized on the generally flat top surface 64 of the upper portion 52. The vent member 62 of the commercially available litter box 50 may be removable in order that a filter disposed under the vent member (not shown) may from time to time be replaced. A handle 66 of a foldable type may be utilized around a portion of the vent member 62, which handle may be folded flat when not in use.

The vent member 62 may be formed in a slightly raised, ridge-shaped portion 68 extending from front to back along the top surface 64 of the upper portion 52. It is to be noted that this ridge-shaped portion 68 is of no particular consequence to this invention, other than necessitating the lowermost portion of my ventilated adapter device 10 being configured in such a way as to be able to be accommodated in a tightly fitting, essentially leak-proof manner upon the top surface 64 of a litter box that is not entirely flat.

With particular reference now to FIG. 2, I have shown the housing member 12 of my device with the upper portion 22 in exploded relationship to the lower portion 24. It will be noted that around the rim 26 of the lower portion 24 is a bead or flange that is capable of being interfitted very tightly with the lower edge 28 of the upper portion 22, so that these portions can be snapped tightly together in the manner shown in FIGS. 3 and 4, so as to form an integral unit 12 of the type illustrated in FIG. 1.

It is also to be noted in FIG. 2 that an upstanding wall member 30 is utilized in a central interior part of the lower portion 24, with this wall member being of rectangular configuration. I will hereinafter refer to this as the lower wall member 30, and in most instances, it preferably is of square configuration. A grill-like vent portion 32, designed to prevent the entry of unwanted items but permitting the upward passage therethrough of air and odors from the litter box, is contained in the central location defined by the lower wall member 30. It is to be understood that the electric fan 34 is of a size and configuration so as to fit tightly within the lower wall member 30.

As will be noted hereinafter in FIG. 4, the bottom surface 25 of the lower housing portion 24 slopes upwardly, so as to dispose the lower wall member 30 at a location somewhat higher than the rim 26, for a reason that will become obvious as the description proceeds.

Although I am not to be limited to an electric fan of any one manufacturer, I have found that in many instances, a fan motor manufactured by Bob Broome of Monroe, N.C. 28110 to be highly suitable for my purposes. It will be noted in FIG. 2 that the previously mentioned electric cord 18 extends from the outer edge of the electric fan 34, and a suitable slot is provided in one location in the upstanding lower wall member, in which the cord can reside. It is to be noted that the fan 34 has electrical terminals not visible in FIG. 2, to which the wires of electric cord 18 are connected.

By the use of the previously mentioned on-off switch 20, the user is able to readily cause the electric fan 34 to operate, or to cease operation. The fan 34 is a low noise, fractional horsepower device, which may, if desired, run on a substantially continuous basis. In the illustrated embodiment, the fan 34 preferably operates on 110 volts A.C., but a different voltage than this may be utilized if desired. For example, in many countries the electric power supplied to homes is at 230 volts, so in such an instance, the electric motor 34 would be configured to operate at that voltage level. It should also be mentioned that on some occasions it may be appropriate to use a battery for operation of the fan, and in such instance, the fan utilized would be configured to operate on direct current of low voltage.

Figure 4:
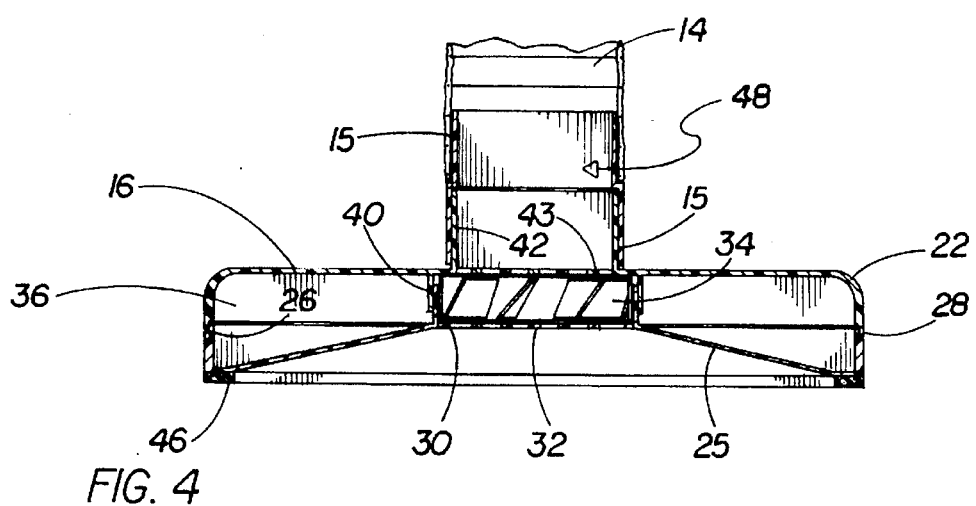
FIG. 4 is a cross sectional view revealing how the electric fan is mounted between the upper and lower portions of the housing member, and ducted in a manner enabling the air of an associated litter box to be withdrawn and expelled through a flexible duct to an out of doors location.

As will be readily appreciated, when the upper portion 22 of the housing member 12 is installed on the lower portion 24, the rim 26 closely interfits with the lower edge 28 of the upper portion 22, with these members preferably "snapping" together in the tightly fitting manner illustrated in FIGS. 3 and 4. Because of this arrangement, it is usually necessary to use the tip of a flat tip screwdriver or the like to cause the upper and lower portions 22 and 24 to separate, should such for any reason become necessary. As an alternative, the upper and lower housing portions may be held together with a series of small screws or other fasteners. It will be noted from FIGS. 1 through 4 that the thickness of the upper and lower portions are similar.

Revealed in FIGS. 2 and 3 is the upstanding, circularly-shaped duct fitting or vent connection 42, which is located on the upper surface 16 of the upper portion 22 of the housing member 12. The fitting or vent connection 42 is disposed directly above an upper wall member 40, that is designed to interfit, in the manner shown in FIGS. 3 and 4, with the previously described lower wall member 30. Inasmuch as the downwardly depending upper wall member 40 is located on the underside of the upper portion 22 of the housing member, it is depicted in FIG. 2 in dashed lines.

The circularly-shaped duct fitting 42, which may be regarded as a "male" member, is of a diameter to receive the "female" end 15 of the flexible vent tube 14. The duct fitting 42 is equipped with a pair of oppositely placed lug members 44, which are to be received in oppositely placed slots 45 located in the end 15 of the tube 14, with these slots being shown in dashed lines in FIG. 2. As is obvious, upon the vertical slots 45 being pushed down over the lug members 44, a locking action can be obtained when the female end 15 of the vent tube 14 has been rotated for approximately a quarter turn.

It is to be noted that on an interior portion of the vent connection or duct fitting 42 is a grill-like member 43, provided as a safety device, to prevent the entry of unwanted items. The grill-like member readily permits, however, the upward flow therethrough of odors from the vent member 62 of the litter box.

With reference to FIG. 3, it will be seen that the upper portion 22 of the housing member 12 has been secured in a closely interfitting relationship with the lower portion 24 of the housing member. Importantly, the previously mentioned downwardly depending upper wall member 40, located on the underside of the upper portion 22, interfits relatively closely with the upstanding lower wall member 30, so as in effect to encapsulate the electric fan 34, in the manner indicated in FIG. 4. It was previously mentioned that the configuration of the upwardly sloping bottom surface 25 is such as to place the lower wall member 30 in a desired relationship to the upper wall member 40.

As best illustrated in FIG. 4, I regard the upwardly sloping bottom surface 25, the lower grill-like member 32, the cavity in which the electric fan is located, the upper grill-like member 43 and the upstanding duct fitting 42 as representing an internal duct 48 through which air removed from the litter box can be pumped by the fan 34.

The electric fan 34 is designed to rotate in a direction serving to pull air and litter box odors upwardly through the vent 62 located in the top of the litter box 50, through the above-described internal duct 48, then forcing such air outwardly through the previously-mentioned flexible vent tube 14. Therefore, it is to be seen that when the user has moved the switch 20 to one of the "on" positions, this causes a flow of air upwardly through the duct 48 comprising the grill-like members 32 and 43, with the previously-mentioned, upwardly sloping surface 25 of the lower housing portion 24 assuring a smooth upward flow of air from the vent member 62 of the litter box, through my adapter device and thereafter into the flexible duct member 14.

It may be noted that surrounding the interfitting wall members 30 and 40 is a space defined between the upper portion 22 and the lower portion 24 of the housing member, which space is not of particular consequence to this invention. This space may be left empty, or it may be filled with a suitable amount of lightweight insulating material.

One of the most significant aspects of this invention is involved in the placement of the relatively soft gasket-like member or seal 46, which is disposed around the lower periphery of the lower portion 24 of the housing member 12. The seal 46, which I may also refer to as the downwardly dependent skirt member, is preferably of easily deformable material in order that it can interface in a tightly fitting, essentially leak-proof manner with the uppermost portion 52 of a litter box 50. An example of the type of material I prefer to use is foam tape, which may be ¼ inch wide, although I am not to be limited to this.

It has already been mentioned that some litter boxes have a ridge-shaped portion 68 extending in a front to back direction along the top of the litter box, so the fact that the seal or downwardly dependent skirt member 46 is of readily deformable material enables the lowermost portion 46 of the housing of my novel ventilated adapter device 10 to fit around the vent member 62 of the litter box in an essentially non-leak manner.

It will now be apparent that my novel ventilated adapter device may be placed on the upper surface of a variety of containers such as commercially available litter boxes, and serve to withdraw foul air from the interior of such litter boxes up through the upper vent location 62 of the litter box, and thence upwardly through the internal duct 48 of the housing member 12, and thereafter force such air outwardly through the duct fitting or top vent 42 thereof at such time as the user moves the switch 20 to an on position, to cause a desired rotation of the electric fan 34.

It will be noted in FIG. 4 that I have illustrated certain of the details of the female end 15 of the flexible tube 14, revealing how it interfits with the previously described upstanding male member 42 mounted upon the upper surface 16 of the upper housing portion 22.

Turning now to FIG. 5, it will be seen that a male end 74 has been installed upon the opposite end of the vent tube 14 from the previously described female end 15 that is connectible in a readily releasable manner to the male member 42 of my novel adapter device 10. The male end 74 is provided with a pair of oppositely placed lug members 76, which are to be received in oppositely placed slots 78 located in the female end 82 of the tubularly-shaped member 80 of metal or plastic that extends through both the inner wall 86 and the outer wall 88. I may hereinafter refer to the tubularly-shaped member 80 as an outlet duct. As is obvious, upon the lug members 76 being inserted into the slots 78, a locking action can be obtained when the male end 74 of the vent tube 14 has been rotated for approximately a quarter turn.

It will also be noted in FIG. 5 that the end of the tubularly-shaped member or outlet duct 80 opposite the female end 82 is a grate-like member 90 designed to prevent the entry of rodents and other unwanted pests into the member 80, while at the same time permitting gases and fumes from the litter box to escape. Other details of the grate-like member 90 are clearly visible in FIG. 7.

In FIG. 5a I have illustrated a closure cap 92 having a male end 94 that is equipped with short protruding lug members 96 positioned to engage the previously mentioned slots 78 of the female end 82. This arrangement enables the cap 92 to be locked in a position preventing the entry of insects or unwanted air from the outside when the flexible vent tube 14 is not in place.

FIG. 6 is a view generally similar to FIG. 5 but revealing that the female connector 82 can be attached to an elbow member 100 connected to an upwardly extending duct or pipe 102 located between walls 86 and 88. This arrangement serves to deliver foul odors from the litter box to the roof of a house or other building, without passing through an outer wall.

In FIG. 8 I illustrate a device usable on the outer end of the tubularly-shaped outlet duct and utilizing a lightweight pivoted member serving to prevent the entry of unwanted air or insects. This device may be of the type utilized on the outlet of a duct used in conjunction with a conventional clothes dryer. Because the pivoted member is supported from its upper location, it serves to direct the foul odors removed from the litter box downwardly, rather than possibly directing the foul odors into a neighbor's yard.

As should now be apparent, I have provided a ventilated adapter device of novel, highly effective construction, enabling a pet owner to readily convert an ordinary, commercially available litter box into a ventilated litter box, with the foul odors from the box being delivered, by a flexible hose removably connected to my novel adapter device, to an out of doors location, typically through an outside wall.

It should also now be apparent that my novel arrangement comprehends utilization with a ventilation system usable in a single family house, where the foul odors emanating from a litter box or the like are conveyed to the outside by piping such odors directly through an outer wall. Alternatively, such odors can be piped directly upward through a duct located in an interior wall, to the roof of the building.

I claim:

1. An adapter device for providing forced air ventilation to a container having an upper vent location, said adapter device comprising an essentially flat housing member having a width substantially greater than its thickness, said housing member having upper and lower portions as well as an interior portion, with a downwardly dependent skirt member extending around said lower portion, and an external duct fitting located upon said upper portion, an internal duct extending upwardly through said lower portion, through said interior portion and being connected to said external duct fitting located on said upper portion, an electric fan operatively mounted in said internal duct, means for supplying electric current to said fan, so that said fan can be caused to rotate and cause air from the container to be pumped upwardly through said internal duct to said external duct fitting, and means connected to said external duct fitting for delivering the air pumped by said fan to a remote location, said adapter device, when said downwardly dependent skirt is placed over the upper vent location of the container, causing air to be removed from the container and to be delivered by said means to the remote location.

2. The adapter device for providing forced air ventilation to a container as recited in claim 1 in which said skirt member is of essentially constant height.

3. The adapter device for providing forced air ventilation to a container as recited in claim 1 in which said skirt member is of readily deformable material.

4. The adapter device for providing forced air ventilation to a container as recited in claim 1 in which said means connected to said external duct fitting for delivering the air to a remote location is an elongate flexible tube.

5. The adapter device for providing forced air ventilation to a container as recited in claim 4 in which the end of said flexible tube remote from said external duct fitting is connected to an outlet located on an adjacent wall.

6. The adapter device for providing forced air ventilation to a container having an upper vent location as recited in claim 4 in which the end of said flexible tube remote from said external duct fitting is equipped with a fitting enabling it to be removably connected to an outlet duct disposed in one of the walls of a room, which outlet duct is connected to deliver the air from the container to an out-of-doors location.

7. An adapter device for providing forced air ventilation to a litter box having an upper vent location, said adapter device comprising an essentially flat housing member of generally rectangular configuration, said housing member having a width substantially greater than its thickness, said housing member having a lower portion, an interior portion, and an upper portion, with an external duct fitting mounted upon said upper portion, and a downwardly dependent skirt member extending continuously around said lower portion, an internal duct extending upwardly through said lower portion of said housing member, through said interior portion and being connected to said external duct fitting located on said upper portion, an electric fan located in said interior portion and operatively mounted in said internal duct, means for supplying electric current to said fan, so that said fan can be caused to rotate and cause air from the litter box to be pumped upwardly through said internal duct to said external duct fitting located on said upper portion, and means connected to said external duct fitting for delivering the air pumped by the fan to a remote location, said adapter device, when said downwardly dependent skirt is placed over the upper vent location of the litter box, causing air to be removed from the litter box and to be delivered through said means connected to said external duct fitting, to the remote location.

8. The adapter device for providing forced air ventilation to a litter box as recited in claim 7 in which said skirt member is of essentially constant height, and slightly larger in size than the upper vent located in the litter box.

9. The adapter device for providing forced air ventilation to a litter box as recited in claim 7 in which said skirt member is of readily deformable material.

10. The adapter device for providing forced air ventilation to a litter box as recited in claim 7 in which said upper and lower housing portions interfit tightly together.

11. The adapter device for providing forced air ventilation to a litter box as recited in claim 7 in which said electric fan is supported between said upper and lower housing portions.

12. The adapter device for providing forced air ventilation to a litter box as recited in claim 7 in which said means connected to said external duct fitting for delivering the air to a remote location is an elongate flexible tube.

13. The adapter device for providing forced air ventilation to a container box having an upper vent location as recited in claim 12 in which the end of said flexible tube remote from said external duct fitting is equipped with a fitting enabling it to be removably connected to an outlet duct disposed in one of the walls of a room, which outlet duct is connected to deliver the air from the container to an out-of-doors location.

14. An adapter device for providing forced air ventilation to a litter box having an upper vent location, said adapter device comprising a housing member of generally rectangular configuration, said housing member being substantially flat and having a width substantially greater than its thickness, said housing member having a lower portion, an interior portion, and an upper portion, with the thickness of said upper and lower portions being similar, an external duct fitting mounted upon said upper portion, and a downwardly dependent skirt member extending continuously around said lower portion, an internal duct extending upwardly through said lower portion of said housing member, through said interior portion and being connected to said external duct fitting located on said upper portion, an electric fan disposed in said interior portion and operatively mounted in said internal duct, means for supplying electric current to said fan, so that said fan can be caused to rotate and cause air to be pumped upwardly through said internal duct to said external duct fitting located on said upper portion, said external duct fitting having fastening means thereon for removably engaging the end of a flexible tube, said flexible tube serving to deliver to a remote location, the air pumped from the litter box by said fan, said adapter device, when said downwardly dependent skirt is placed over the upper vent location of the litter box, causing air to be removed from the litter box and to be delivered through said flexible tube to the remote location.

15. The adapter device for providing forced air ventilation to a litter box having an upper vent location as recited in claim 14 in which the end of said flexible tube remote from said external duct fitting is equipped with a fitting enabling it to be removably connected to an outlet duct disposed in one of the walls of a room, which outlet duct is connected to deliver the air from the litter box to an out-of-doors location.

16. The adapter device for providing forced air ventilation to a litter box as recited in claim 14 in which said skirt member is of essentially constant height, and slightly larger in size than the upper vent located in the litter box.

17. The adapter device for providing forced air ventilation to a litter box as recited in claim 14 in which said skirt member is of readily deformable material.

18. The adapter device for providing forced air ventilation to a litter box as recited in claim 14 in which said upper and lower housing portions interfit tightly together.

19. The adapter device for providing forced air ventilation to a litter box as recited in claim 14 in which said electric fan is supported between said upper and lower housing portion.

* * * * *